United States Patent
Spryshak (10) Patent No.: US 12,083,866 B2
(45) Date of Patent: Sep. 10, 2024

(54) INTEGRATED REFRIGERANT CONTROL MODULES

(71) Applicant: Air International (US) Inc., Auburn Hills, MI (US)

(72) Inventor: Joseph J. Spryshak, Hartland, MI (US)

(73) Assignee: Air International (US) Inc., Auburn Hills, MI (US)

( * ) Notice: Subject to any disclaimer, the term of this patent is extended or adjusted under 35 U.S.C. 154(b) by 82 days.

(21) Appl. No.: 17/743,876

(22) Filed: May 13, 2022

(65) Prior Publication Data

US 2023/0364972 A1  Nov. 16, 2023

(51) Int. Cl.
  F25B 41/00  (2021.01)
  B60H 1/00  (2006.01)
  B60H 1/32  (2006.01)

(52) U.S. Cl.
  CPC .......... B60H 1/323 (2013.01); B60H 1/3227 (2013.01); F25B 2500/18 (2013.01)

(58) Field of Classification Search
  CPC .............. B60H 1/3229; B60H 1/00485; B60H 1/3227; B60H 2001/00957; B60H 2001/00928; B60H 1/00342; B60H 1/323; F25B 2500/18; F25B 41/00; F25B 41/325; F25B 2400/16; F25B 2400/13; F28F 9/00
  See application file for complete search history.

(56) References Cited

U.S. PATENT DOCUMENTS

2022/0412611 A1\* 12/2022 Brown ................. F25B 49/022

FOREIGN PATENT DOCUMENTS

| CN | 206207815 U | \* | 5/2017 |
| CN | 215751808 U | \* | 2/2022 |
| DE | 202021104430 U1 | | 8/2021 |
| EP | 1932696 A2 | | 6/2008 |
| EP | 3260806 A1 | | 12/2017 |
| WO | 2021049435 A1 | | 3/2021 |

OTHER PUBLICATIONS

International Search Report for International Application No. PCT-tUS20231022220 dated Sep. 7, 2023.

\* cited by examiner

Primary Examiner — Jianying C Atkisson
Assistant Examiner — Esmeralda Arreguin-Martinez
(74) Attorney, Agent, or Firm — Carlson, Gaskey & Olds, P.C.

(57) ABSTRACT

A vehicle refrigeration system includes a compressor, a condenser in fluid communication with the compressor, a chiller, a vapor injection module, and a refrigerant control block. The refrigerant control block includes a plurality of outer walls which provide a plurality of openings in fluid communication with a plurality of internal fluid paths. The plurality of openings include a VPI block outlet and a chiller block outlet. A first EXV opening receives a first EXV for modulating refrigerant flow out of the VPI block outlet through the vapor injection module to the compressor. A second EXV opening receives a second EXV for modulating refrigerant flow out of the chiller block outlet to the chiller.

19 Claims, 7 Drawing Sheets

INTEGRATED REFRIGERANT CONTROL MODULES

BACKGROUND

Vehicles may have a HVAC (Heating, ventilation, and air conditioning) climate control system located within an instrument panel which provides conditioned air, such as by heating or cooling or dehumidifying, through various outlets to occupants in the vehicle cabin.

Additionally, the vehicle may have other components and systems that receive controlled heat transfer. For example, the batteries may be heated or cooled to stay within optimal performance and to increase longevity. The heat sink or heat source for such HVAC systems and other heating or cooling may be generated by a refrigeration system.

SUMMARY

A vehicle refrigeration system according to an example of this disclosure includes a compressor, a condenser in fluid communication with the compressor, a chiller, a vapor injection module, and a refrigerant control block. The refrigerant control block includes a plurality of outer walls which provide a plurality of openings in fluid communication with a plurality of internal fluid paths. The plurality of openings include a VPI block outlet and a chiller block outlet. A first EXV opening receives a first EXV for modulating refrigerant flow out of the VPI block outlet through the vapor injection module to the compressor. A second EXV opening receives a second EXV for modulating refrigerant flow out of the chiller block outlet to the chiller.

In a further example of the foregoing, the refrigerant control block provides an internal heat exchanger, which provides a first internal refrigerant path that receives refrigerant flowing from the vapor injection module to the chiller and a second internal refrigerant path receives refrigerant flowing from the chiller to the compressor.

In a further example of any of the foregoing, the refrigerant control block is monolithic.

In a further example of any of the foregoing, the refrigerant control block includes metal.

In a further example of any of the foregoing, one of the plurality of outer walls is a first wall, which provides the chiller block outlet and the VPI block outlet.

In a further example of any of the foregoing, the first wall extends substantially lengthwise and heightwise.

In a further example of any of the foregoing, another one of the plurality of outer walls is a second wall, which provides the first EXV opening and the second EXV opening. The second wall extends substantially lengthwise and widthwise.

In a further example of any of the foregoing, the vehicle refrigeration system includes a receiver drier mounted to the second wall.

In a further example of any of the foregoing, the plurality of openings includes a condenser block inlet, which is provided in the first wall and receives refrigerant flowing from the condenser to the receiver drier.

In a further example of any of the foregoing, the system is configured for refrigerant flow from the condenser into the refrigerant control block at the condenser block inlet, internally through one of the plurality of internal fluid paths to the receiver drier, and then internally through a second of the plurality of internal fluid paths to the first EXV.

In a further example of any of the foregoing, the plurality of openings include a VPI block inlet and a second VPI block outlet on the first wall. The system is configured for a second refrigerant path internally through a third of the plurality of internal fluid paths from the receiver drier, out of the second VPI block outlet, through the vapor injection module, into the refrigerant control block through the VPI block inlet, internally through a fourth of the plurality of internal fluid paths, which is included through an internal heat exchanger provided by the refrigerant control block, and to the second EXV.

In a further example of any of the foregoing, the path through the internal heat exchanger extends lengthwise.

In a further example of any of the foregoing, the refrigerant control block is mounted to the chiller and the vapor injection module.

In a further example of any of the foregoing, the vehicle refrigeration system includes a second chiller. The chiller is a first chiller and the chiller outlet is a first chiller block outlet. The plurality of openings includes a third EXV opening and a second chiller block outlet. The third EXV opening receives a third EXV for modulating refrigerant flow out of the second chiller block outlet to the second chiller.

In a further example of any of the foregoing, the plurality of openings include a chiller block inlet for receiving refrigerant from the first chiller and the second chiller. The refrigerant flows from the chiller block inlet, through an internal heat exchanger provided by the refrigerant control block, and to the compressor.

In a further example of any of the foregoing, the refrigerant control block is mounted to the first chiller and the vapor injection module.

In a further example of any of the foregoing, one of the plurality of outer walls is a first wall, which provides the first chiller block outlet, the second chiller block outlet, and the VPI block outlet.

In a further example of any of the foregoing, the first wall extends lengthwise and heightwise.

In a further example of any of the foregoing, another one of the plurality of outer walls is a second wall, which provides the first EXV opening, the second EXV opening, and the third EXV opening, the second wall extends lengthwise and widthwise.

In a further example of any of the foregoing, the refrigerant control block is mounted to the chiller and the vapor injection module.

These and other features may be best understood from the following specification and drawings, the following of which is a brief description.

DETAILED DESCRIPTION

This disclosure is related to HVAC and refrigeration systems, and more particularly to a refrigerant control block having multiple refrigerant interfaces.

Figure 1:
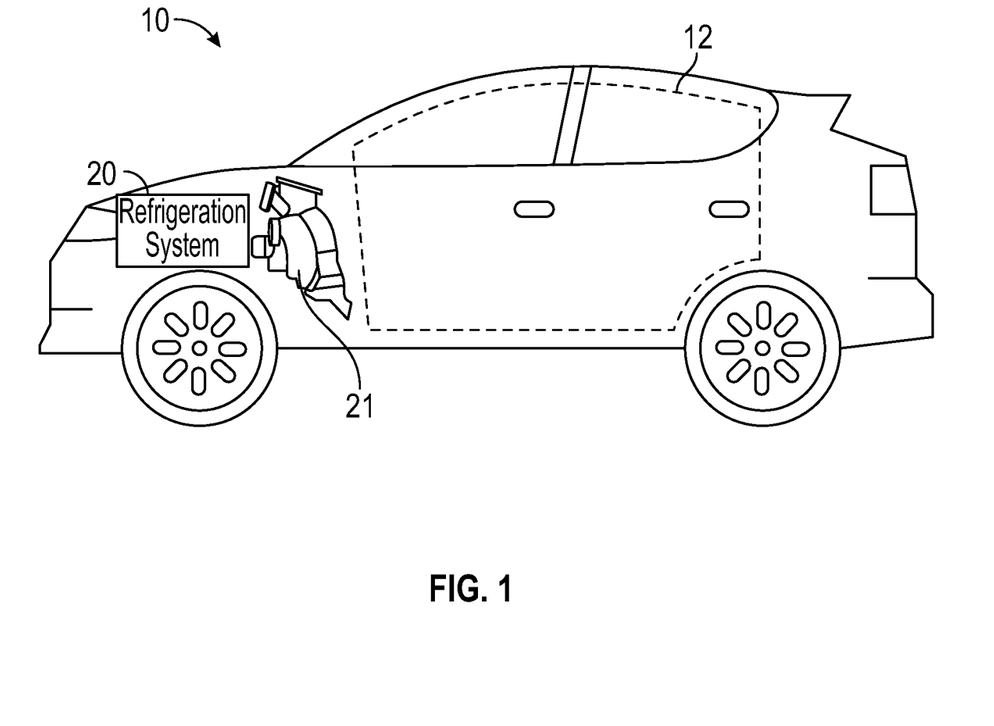
FIG. 1 schematically illustrates an example HVAC system and refrigeration system in a vehicle.

FIG. 1 schematically illustrates a vehicle 10 including an example refrigeration system 20. In some examples, the example refrigeration system 20 may provide heat sink and source of heat in order to allow an HVAC system 21 to provide conditioned air to a vehicle cabin 12. In some examples, the example refrigeration system 20 may cool or heat components or systems on board the vehicle. In some examples, glycol or other heat transfer fluid will get heated or cooled in the refrigeration system 20 and then flow to the HVAC system 21 or other components such as batteries, traction motors, electronics, etc. to exchange heat. In some examples, the vehicle 10 may include any of automobiles, heavy trucks, agricultural vehicles, or commercial vehicles.

Figure 2:
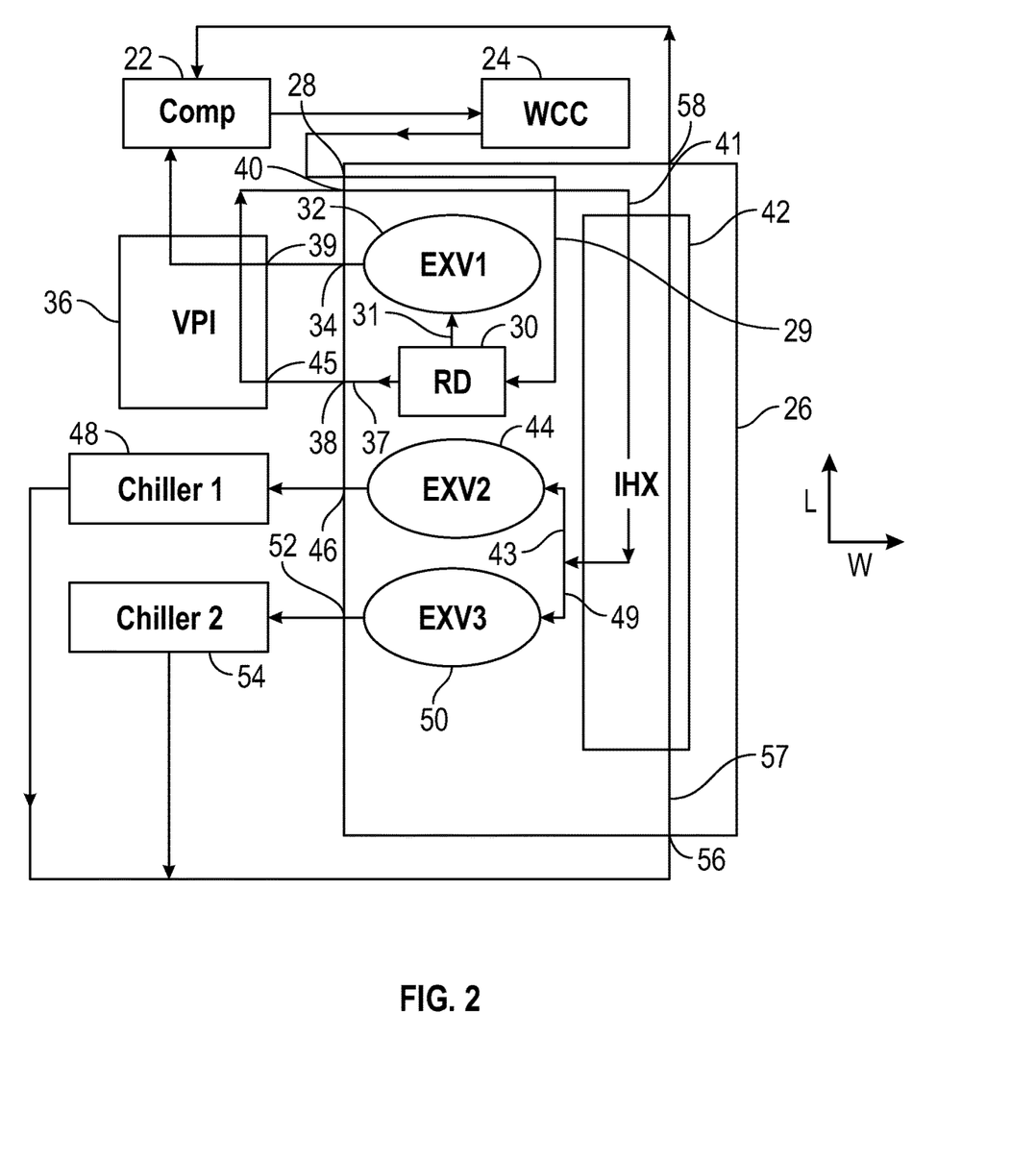
FIG. 2 schematically illustrates the example refrigeration system of FIG. 1.

FIG. 2 schematically illustrates the example refrigeration system 20 of FIG. 1. Refrigerant enters a compressor 22 as low-pressure, low-temperature gas, and leaves the compressor 22 as a high-pressure, high-temperature gas and flows to a condenser 24, which removes heat from the hot refrigerant vapor until it condenses into a saturated liquid state. In some examples, the condenser 24 is a water-cooled condenser, in which it removes heat from refrigerant vapor and transfers the heat to the water running through it. The compressor 22 may be a vapor injection compressor in some examples. In the example, the refrigerant flows from the condenser 24 into a refrigerant control block 26 at block inlet 28 ("the condenser block inlet 28") and flows through an internal path 29 within the refrigerant control block 26 to a receiver drier 30 to clean and remove moisture from the system.

The example control block 26 is a solid block with openings in its outer walls providing block inlets and outlets 28, 34, 38, 40, 46, 52 internal to the control block 26 in fluid communication with internal fluid paths 29, 31, 37, 41, 43, 49, 57, as shown schematically. In some examples, the control block 26 is formed of metal. In some examples, the control block 26 includes aluminum. In some examples, the control block 26 is formed of resin. In some examples, the control block 26 is formed by one or more of extrusion, casting, and forging. In some examples, the control block 26 is monolithic. In some examples, the internal fluid paths and openings may be formed by voids in the material of the control block 26. The word "internal" as used herein generally means within the outer walls of the control block 26.

From the receiver drier 30, a first refrigerant path 31 flows from the receiver drier 30 internally to the refrigerant control block 26 across a first expansion valve (EXV) 32, out of the refrigerant control block 26 through a block outlet 34 ("the VPI outlet"). Generally, herein, the control block 26 inlets and outlets will be named with the first word being the upstream component for block inlets and the downstream component for block outlets. For example, the block outlet 34 will be named VPI block outlet 34, and the block inlet 28 will be named condenser block inlet 28. The first expansion valve 32 modulates flow out of the VPI block outlet 34. From there, the refrigerant flows through a vapor injection module ("VPI") 36, in some examples through a saturated mid pressure inlet 39 of the vapor injection module 36, and within the vapor injection module 36 the refrigerant exchanges heat with another refrigerant path (discussed below) before flowing back to the compressor 22. The vapor injection module 36 may be referred to simply as a "vapor injector." The vapor injection module 36 reduces or eliminates the amount of liquid refrigerant flowing to the compressor 22. A second refrigerant path 37 from the receiver drier 30 flows internally to the refrigerant control block 26 and then out of the refrigerant control block 26 at a second VPI block outlet 38, into the vapor injection module 36 at a VPI liquid inlet 45, through the vapor injection module 36, back into the refrigerant control block 26 at a VPI block inlet 40, through an internal flow path 41, including through an internal heat exchanger ("IHX") 42 provided by a lengthwise flow path within the refrigerant control block 26. The internal flow path 41 may be referred to simply as a "heat exchanger refrigerant path." In some examples, the VPI block inlet 40 is block inlet from a high-pressure liquid outlet of the vapor injection module 36. In some examples the locations for inlets outlets 28/40 are reversed.

In some examples, as shown, refrigerant exits the internal heat exchanger 42 and splits, within the refrigerant control block 26, into a first internal flow path 43 and a second internal flow path 49. The first internal flow path 43 flows across a second expansion valve 44, and then exits the refrigerant control block 26 through first chiller block outlet 46 flowing through a first chiller 48. The second expansion valve 44 modulates flow through the first chiller block outlet 46. The second internal flow path 49 of the split flows across a third expansion valve 50, and then exits the refrigerant control block 26 through outlet 52 flowing through a second chiller 54. In some examples, as shown schematically the refrigerant exiting the chillers 48, 54 may join paths before flowing back into the refrigerant control block 26 at a chiller block inlet 56, through an internal flow path 57, including through the internal heat exchanger 42, and then exiting the refrigerant control block 26 at compressor block outlet 58, and flowing to the compressor 22. The internal flow path 57 may be referred to simply as a "heat exchanger refrigerant path." In some examples, as shown, the flow path 41 through the internal heat exchanger 42 and the flow path 52 through the internal heat exchanger 42 have generally opposite lengthwise directions.

Although two chillers 48, 54 are shown in the illustrative example, more or fewer chillers may be utilized in some examples. In some examples, the chillers 48, 54 reduce the temperature of coolant flowing through the chillers 48, 54 by exchanging heat with the refrigerant flowing through. The coolant can then be used to cool various areas or components of the vehicle, including the cabin, another heat exchanger, the battery, vehicle electronics, drive motors in some examples.

Figure 3:
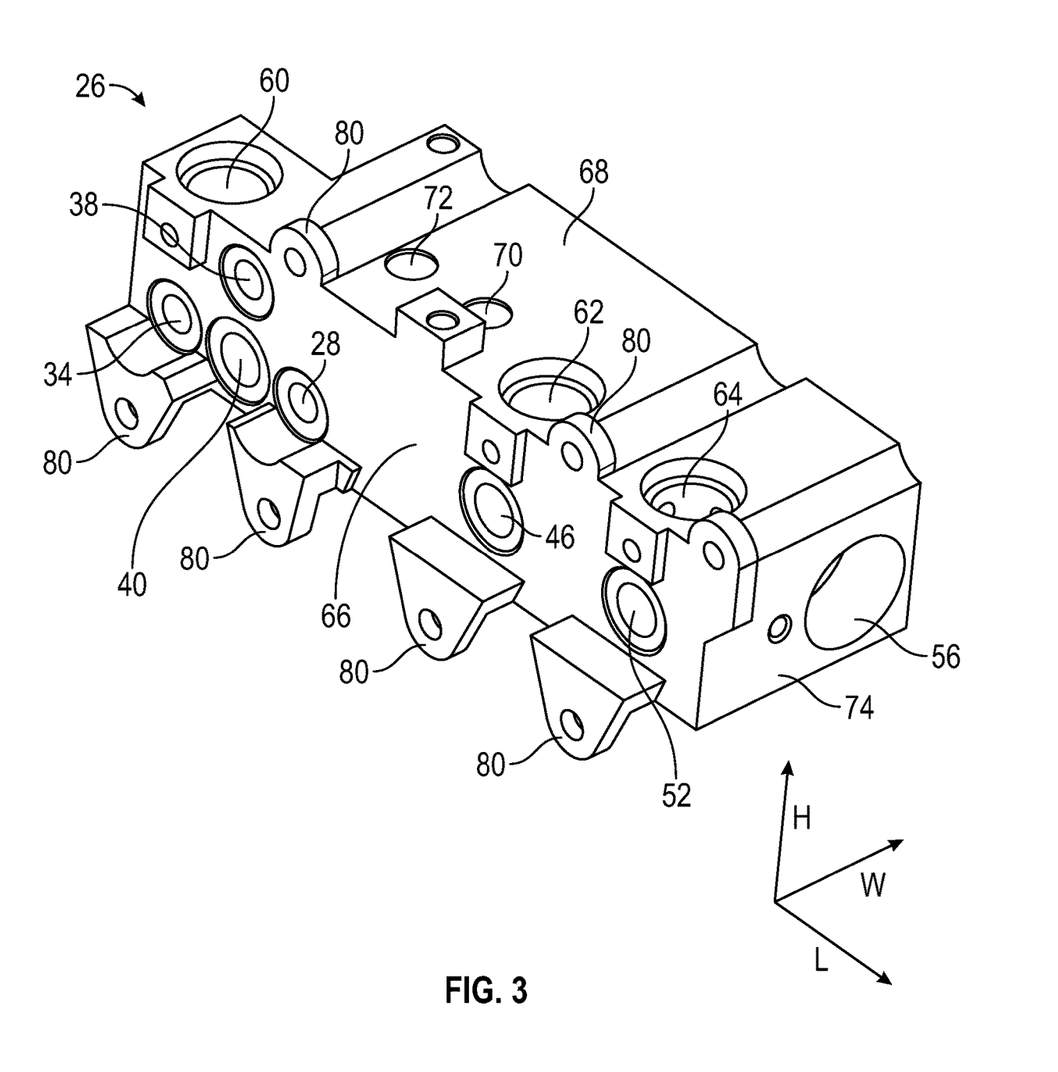
FIG. 3 is an isometric view of an example control block of the example refrigeration system of FIGS. 1-2.

FIG. 3 illustrates an example control block 26. A first EXV opening 60 receives the first EXV 32 (not shown; see FIG. 2) for modulating refrigerant flow out of the firstVPI outlet 34 on the control block 26 through the vapor injection module (not shown; see FIG. 2) to the compressor (not shown; see FIG. 2). A second EXV opening 62 receives a second EXV 44 (not shown; see FIG. 2) for modulating refrigerant flow out of a first chiller block outlet 46 on the control block 26 to the first chiller 48 (not shown; see FIG. 2). The control block 26 may include a third EXV opening 64 receiving a third EXV 50 (not shown; see FIG. 2) for modulating refrigerant flow out of a second chiller block outlet 52 on the control block 26 to the second chiller 54 (not shown; see FIG. 2).

In some examples, as shown, a first wall 66 of the refrigerant control block 26 provides the block inlets and outlets 28, 34, 38, 40, 46, 52. In some examples, the first wall 66 extends substantially lengthwise and heightwise. In some examples, the wall 66 is formed of one or more coplanar faces, or one or more faces lying in different planes that are substantially parallel to each other (±20 degrees). In some examples, center axes perpendicular to each block inlet and outlet 28, 34, 38, 40, 46, 52 at its respective wall surface are substantially parallel to each other (±20 degrees).

In some examples, as shown, the refrigerant control block 26 includes a second wall 68 providing the first EXV opening 60, the second EXV opening 62, and the third EXV opening 64. In some examples, the second wall 68 extends substantially lengthwise and widthwise. In some examples, the wall 68 is formed of one or more coplanar faces, or one or more faces lying in different planes that are substantially parallel to each other (±20 degrees). The walls 66, 68 may be adjoining walls in some examples, as shown. In some examples, the receiver drier 30 (not shown; see FIG. 2) is mounted to the second wall 68. In such examples, as shown, the second wall 68 provides an outlet 70 from the refrigerant control block 26 to the receiver drier 30 and an inlet 72 from the receiver drier 30 to the control block. In other examples, the receiver drier 30 may be mounted to a wall opposite the second wall 68 in the heightwise direction. The example chiller block inlet 56 is provided at a third wall 74. The third wall 74 may adjoin the first and second walls 66, 68, as shown. In some examples, center axes perpendicular to each opening 60, 62, 64, 70, 72 at its respective wall surface are substantially parallel to each other (±20 degrees).

Figure 4:
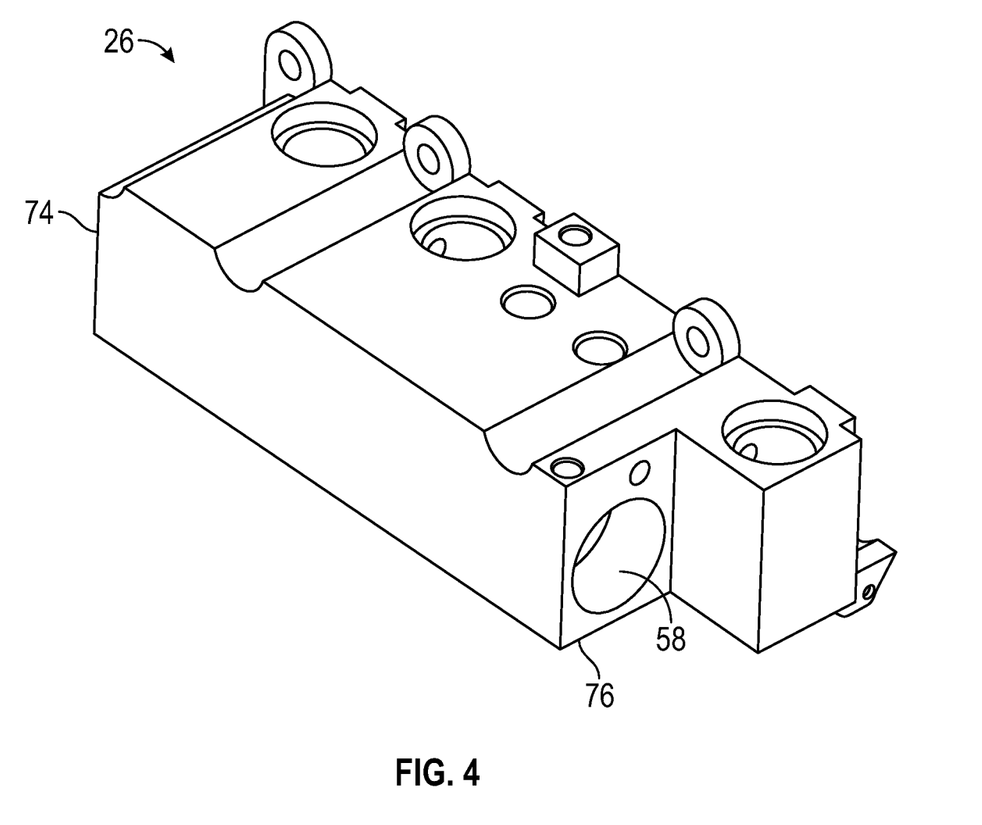
FIG. 4 is another isometric view of the example control block of FIG. 3.

FIG. 4 illustrates a different view of the example control block 26 showing the compressor block outlet 58 at a fourth wall 76 opposite the third wall 74 in the lengthwise direction.

Figure 5:
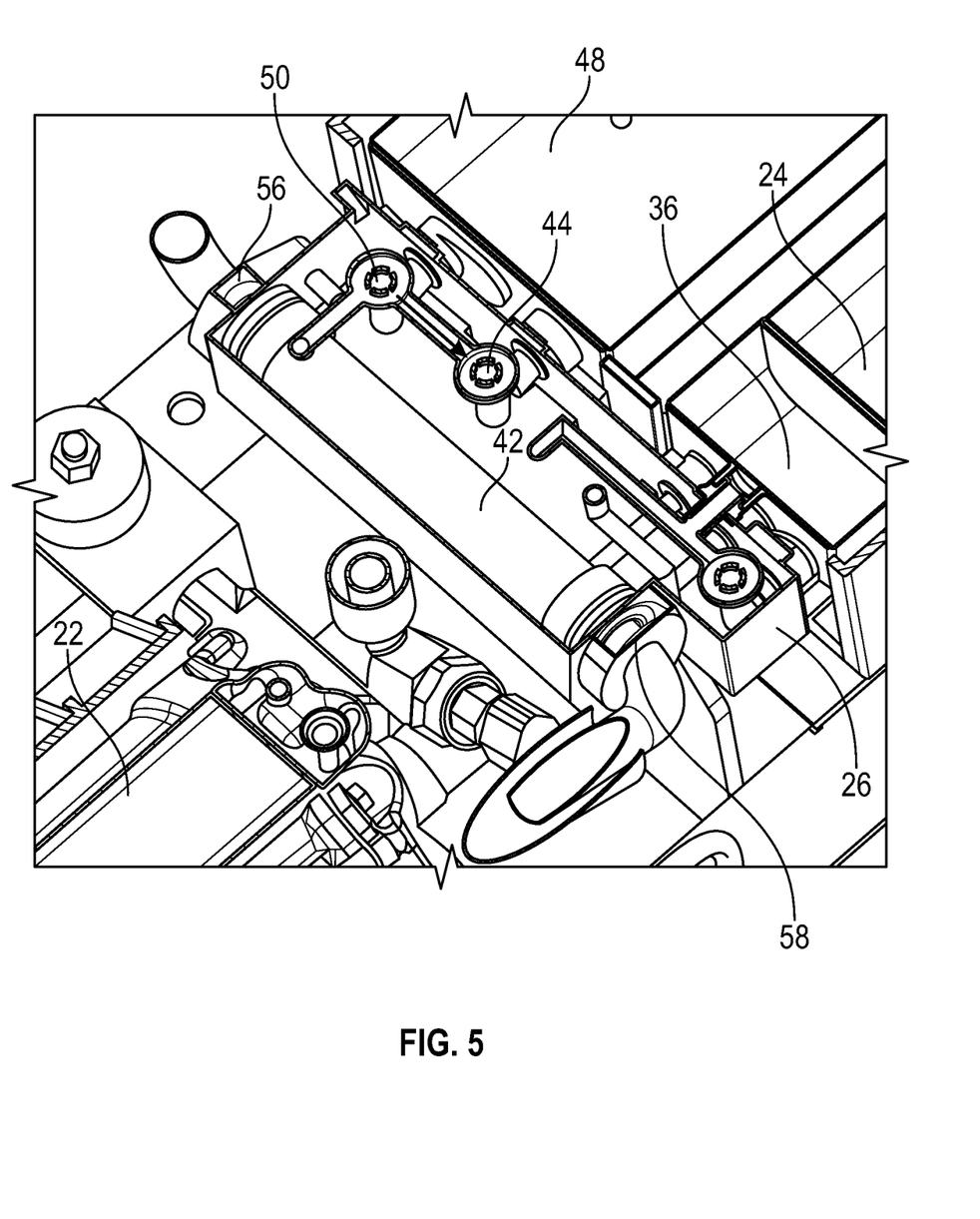
FIG. 5 is an interior view of the example control block of FIGS. 3-4.

FIG. 5 illustrates a sectional view of part of the example refrigeration system 20 of FIGS. 1-4. The control block 26 provides an internal heat exchanger 42 including a cylindrical passage providing one or more refrigerant paths. The example control block 26 is mounted to the first chiller 48 and the vapor injection module 36. In some examples, example control block 26 is mounted to the first chiller 48 and the vapor injection module 36 by bolting the control block 26 to respective housings of the first chiller 48 and the vapor injection module 36. The example control block 26 may include one or more brackets 80 (see FIG. 3) for the mounting. The example control block 26 eliminates plumbing to heat exchangers, reduces cost and assembly time, and reduces leak paths. One wall of the control block 26 interfaces with liquid refrigerant connections to multiple heat exchangers. It is noted that FIG. 5 is a sectional view with the top of the control block 26 removed. The example control block 26 is solid and may be drilled and plugged to obtain the internal passages needed. In some examples the IHX through hole 42 may be created using an extrusion process with a profile that includes the hole.

Figure 6:
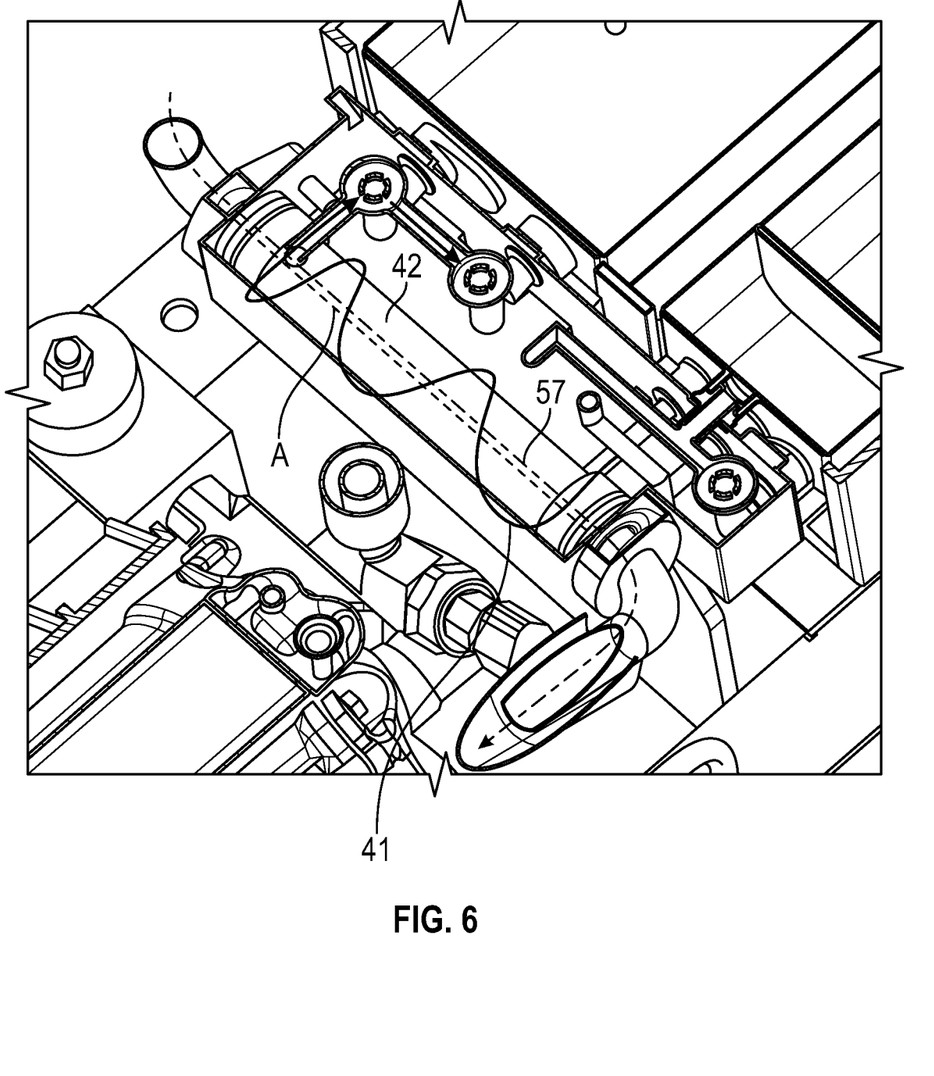
FIG. 6 is another interior view of the example control block of FIGS. 3-5.

FIG. 6 schematically illustrates refrigerant flow through the internal heat exchanger 42. In some examples, as shown, the path 57 through the internal heat exchanger 42 is substantially in an axial direction with regard to the axis A of the internal heat exchanger 42, and the path 41 through internal heat exchanger 42 is a spiraling path. In some examples, the path 57 may flow through an inner diameter section of the internal heat exchanger 42, and the path 41 may flow through an outer diameter section. In some examples, the refrigerant in path 57 is a low pressure vapor, and the refrigerant in path 41 is a high pressure liquid.

Figure 7:
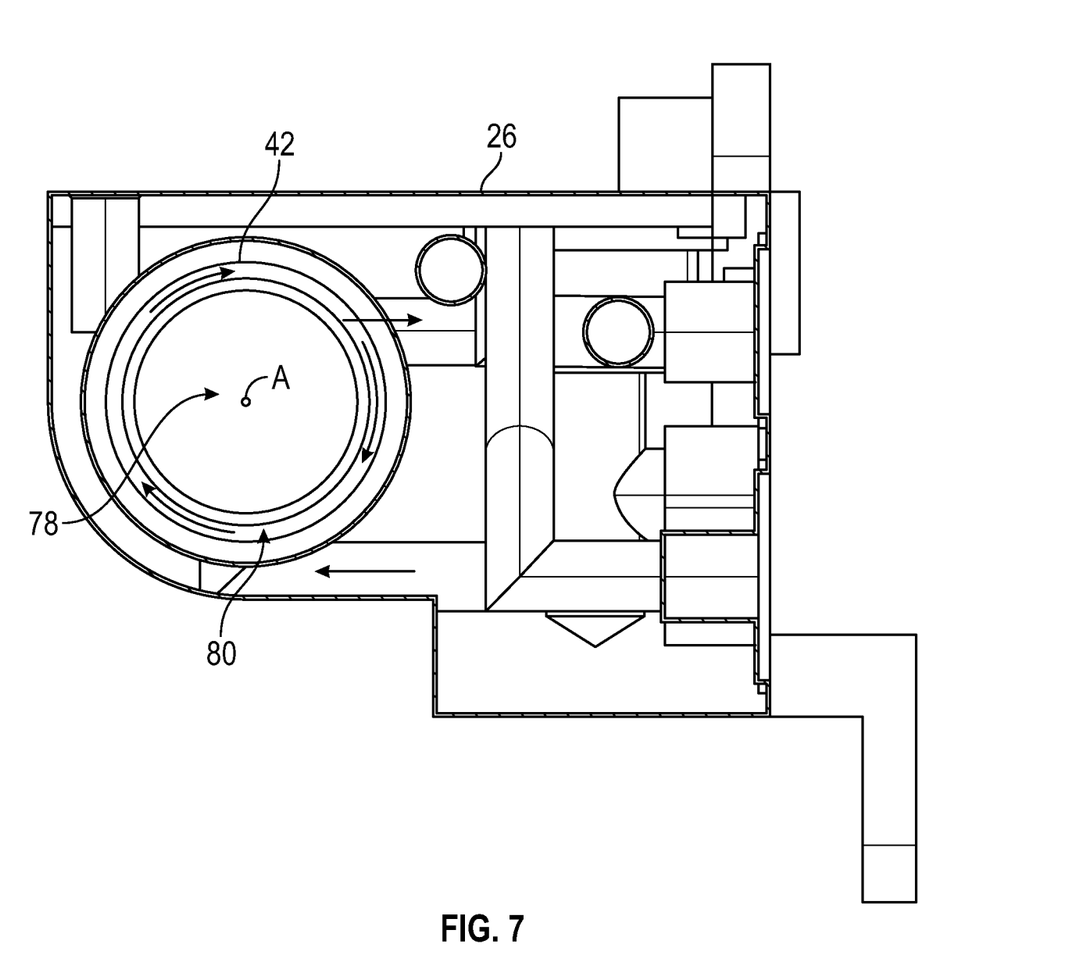
FIG. 7 illustrates a sectional view of the example control block of FIGS. 3-6.

FIG. 7 illustrates a sectional view of the example control block 26 through the internal heat exchanger 42. In the example, with continued reference to FIG. 6, the path 57 flows through an inner diameter section 78 of the internal heat exchanger 42, and the path 41 flows through a fluidly separate outer diameter section 80 of the internal heat exchanger 42. The function of heat exchange between liquid refrigerant upstream of expansion and suction line refrigerant downstream of chillers 48, 54 is integrated completely into integrated refrigerant control block 26. In some examples, the through hole for the internal heat exchanger 42 may be part of the refrigerant control block 26 extrusion profile.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle refrigeration system, comprising:
   a compressor;
   a condenser in fluid communication with the compressor;
   a chiller;
   a vapor injector;
   a receiver drier; and
   a refrigerant control block including a plurality of outer walls providing a plurality of openings in fluid communication with a plurality of internal fluid paths, the plurality of openings comprising:
      a VPI block outlet,
      a chiller block outlet,
      a first EXV opening receiving a first EXV for modulating refrigerant flow out of the VPI block outlet through the vapor injector to the compressor,
      a second EXV opening receiving a second EXV for modulating refrigerant flow out of the chiller block outlet to the chiller,
      a condenser block inlet for receiving refrigerant flowing from the condenser to the receiver drier, wherein the system is configured for refrigerant flow from the condenser into the refrigerant control block at the condenser block inlet, internally through one of the plurality of internal fluid paths to the receiver drier, and then internally through a second of the plurality of internal fluid paths to the first EXV,
      a VPI block inlet, and
      a second VPI block outlet, wherein the system is configured for refrigerant flow internally through a third of the plurality of internal fluid paths from the receiver drier, out of the second VPI block outlet, through the vapor injector, into the refrigerant control block through the VPI block inlet, internally through a fourth of the plurality of internal fluid paths, the fourth internal fluid path including a first heat exchanger refrigerant path through an internal heat exchanger provided by the refrigerant control block, and to the second EXV.

2. The vehicle refrigeration system as recited in claim 1, wherein the refrigerant control block provides the first heat exchanger refrigerant path receiving refrigerant flowing from the vapor injector to the chiller and a second heat exchanger refrigerant path receiving refrigerant flowing from the chiller to the compressor.

3. The vehicle refrigeration system as recited in claim 1, wherein the refrigerant control block comprises metal.

4. The vehicle refrigeration system as recited in claim 1, wherein one of the plurality of outer walls is a first wall providing the chiller block outlet and the VPI block outlet, wherein the first wall extends substantially lengthwise and heightwise, such that each face of the first wall is within 20 degrees of a plane defined in lengthwise and heightwise directions, the lengthwise and heightwise directions being perpendicular to one another.

5. The vehicle refrigeration system as recited in claim 4, wherein another one of the plurality of outer walls is a second wall providing the first EXV opening and the second EXV opening, the second wall extending substantially lengthwise and widthwise, such that each face of the second wall is within 20 degrees of a second plane defined in the lengthwise and widthwise directions, the lengthwise and widthwise directions being perpendicular to one another, and the heightwise and widthwise directions being perpendicular to one another.

6. The vehicle refrigeration system as recited in claim 5, wherein the receiver drier is mounted to the second wall.

7. The vehicle refrigeration system as recited in claim 6, wherein the first heat exchanger refrigerant path extends lengthwise.

8. The vehicle refrigeration system as recited in claim 7, wherein the refrigerant control block is mounted to the chiller and the vapor injector.

9. The vehicle refrigeration system as recited in claim 1, further comprising a second chiller, wherein the chiller is a first chiller and the chiller block outlet is a first chiller block outlet, wherein the plurality of openings includes a third EXV opening and a second chiller block outlet, the third EXV opening receiving a third EXV for modulating refrigerant flow out of the second chiller block outlet to the second chiller.

10. The vehicle refrigeration system as recited in claim 9, wherein the plurality of openings includes a chiller block inlet for receiving refrigerant from the first chiller and the second chiller, wherein the refrigerant flows from the chiller block inlet, through an internal heat exchanger provided by the refrigerant control block, and to the compressor.

11. The vehicle refrigeration system as recited in claim 10, wherein the refrigerant control block is mounted to the first chiller and the vapor injector.

12. The vehicle refrigeration system as recited in claim 11, wherein one of the plurality of outer walls is a first wall providing the first chiller block outlet, the second chiller block outlet, and the VPI block outlet.

13. The vehicle refrigeration system as recited in claim 12, wherein another one of the plurality of outer walls is a second wall providing the first EXV opening, the second EXV opening, and the third EXV opening, the second wall extending lengthwise and widthwise.

14. The vehicle refrigeration system as recited in claim 1, wherein the refrigerant control block is mounted to the chiller and the vapor injector.

15. The vehicle refrigeration system as recited in claim 2, wherein the internal heat exchanger includes a cylindrical passage within the refrigerant control block including an inner diameter cylindrical portion and an outer diameter portion radially outward of the inner diameter cylindrical portion, and the first heat exchanger refrigerant path is through one of the inner diameter cylindrical portion and the outer diameter portion and the second heat exchanger refrigerant path is through the other of the inner diameter cylindrical portion and the outer diameter portion.

16. A vehicle refrigeration system, comprising:
a compressor;
a condenser in fluid communication with the compressor;
a chiller;
a vapor injector; and
a refrigerant control block including a plurality of outer walls including a first wall and a second wall providing a plurality of openings in fluid communication with a plurality of internal fluid paths, the plurality of openings comprising:
a VPI block outlet on the first wall,
a chiller block outlet on the first wall,
a first EXV opening on the second wall receiving a first EXV for modulating refrigerant flow out of the VPI block outlet through the vapor injector to the compressor, and
a second EXV opening on the second wall receiving a second EXV for modulating refrigerant flow out of the chiller block outlet to the chiller,
wherein the first wall extends substantially lengthwise and heightwise, such that each face of the first wall is within 20 degrees of a plane defined in lengthwise and heightwise directions, the lengthwise and heightwise directions being perpendicular to one another, and
the second wall extends substantially lengthwise and widthwise, such that each face of the second wall is within 20 degrees of a second plane defined in the lengthwise and widthwise directions, the lengthwise and widthwise directions being perpendicular to one another, and the heightwise and widthwise directions being perpendicular to one another,
wherein the plurality of outer walls includes a third wall adjoining the first wall and the second wall, the third wall providing a chiller block inlet for receiving fluid from the chiller and through an internal heat exchanger within the refrigerant control block.

17. The vehicle refrigeration system as recited in claim 16, wherein the plurality of outer walls includes a fourth wall opposite the third wall in the lengthwise direction and including a compressor block outlet configured for fluid to exit the internal heat exchanger to the compressor.

18. A vehicle refrigeration system, comprising:
a compressor;
a condenser in fluid communication with the compressor;
a chiller;
a vapor injector; and
a refrigerant control block including a plurality of outer walls providing a plurality of openings in fluid communication with a plurality of internal fluid paths, the plurality of openings comprising:
a VPI block outlet,
a chiller block outlet,
a first EXV opening receiving a first EXV for modulating refrigerant flow out of the VPI block outlet through the vapor injector to the compressor, and
a second EXV opening receiving a second EXV for modulating refrigerant flow out of the chiller block outlet to the chiller,
wherein the refrigerant control block provides an internal heat exchanger providing a first heat exchanger refrigerant path receiving refrigerant flowing from the vapor injector to the chiller and a second heat exchanger refrigerant path receiving refrigerant flowing from the chiller to the compressor, and
the internal heat exchanger includes a cylindrical passage within the refrigerant control block including an inner diameter cylindrical portion and an outer diameter portion radially outward of the inner diameter cylindrical portion, and the first heat exchanger refrigerant path is through one of the inner diameter cylindrical portion and the outer diameter portion and the second heat exchanger refrigerant path is through the other of the inner diameter cylindrical portion and the outer diameter portion.

19. The vehicle refrigeration system as recited in claim 18, wherein one of the plurality of outer walls is a first wall providing the chiller block outlet and the VPI block outlet, wherein the first wall extends substantially lengthwise and heightwise, such that each face of the first wall is within 20 degrees of a plane defined in the lengthwise and heightwise directions, the lengthwise and heightwise directions being perpendicular to one another, and another one of the plurality of outer walls is a second wall providing the first EXV opening and the second EXV opening, the second wall extending substantially lengthwise and widthwise, such that each face of the second wall is within 20 degrees of a second plane defined in the lengthwise and widthwise directions, the lengthwise and widthwise directions being perpendicular to one another, and the heightwise and widthwise directions being perpendicular to one another.

\* \* \* \* \*